(12) United States Patent
Wigren et al.

(10) Patent No.: US 11,991,734 B2
(45) Date of Patent: *May 21, 2024

(54) FINGERPRINTING ENHANCEMENT WITH MULTI-BAND AoA MEASUREMENTS

(71) Applicant: TELEFONAKTIEBOLAGET LM ERICSSON (PUBL), Stockholm (SE)

(72) Inventors: Torbjörn Wigren, Uppsala (SE); Meng Wang, Vic (AU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,031

(22) Filed: Jun. 1, 2021

(65) Prior Publication Data
US 2021/0289511 A1 Sep. 16, 2021

Related U.S. Application Data

(63) Continuation of application No. 16/607,038, filed as application No. PCT/IB2017/052321 on Apr. 21, 2017, now Pat. No. 11,026,242.

(51) Int. Cl.
*H04W 72/542* (2023.01)
*G01S 5/02* (2010.01)
(Continued)

(52) U.S. Cl.
CPC ....... *H04W 72/542* (2023.01); *G01S 5/02525* (2020.05); *G01S 5/0268* (2013.01);
(Continued)

(58) Field of Classification Search
CPC ... H04W 64/006; H04W 84/12; H04W 4/023; H04W 4/80; H04W 48/16; H04W 64/00;
(Continued)

(56) References Cited

U.S. PATENT DOCUMENTS 9,414,371 B2    8/2016   Pi et al.
9,973,249 B2    5/2018   Onggosanusi et al.
(Continued)

FOREIGN PATENT DOCUMENTS

CN         106028447 A   *   10/2016          H04W 64/00
WO       2015128880 A2     9/2015
(Continued)

OTHER PUBLICATIONS

3GPP TS 36.455, v13.1.0, 3rd Generation Partnership Project; Technical Specification Group Radio Access Network; Evolved Universal Terrestrial Radio Access (E-UTRA); LTE Positioning Protocol A (LPPa) (Release 13), Mar. 2016.

(Continued)

*Primary Examiner* — Matthew C Sams
(74) *Attorney, Agent, or Firm* — Weisberg I.P. Law, P.A.

(57) ABSTRACT

A method and a radio access device for performing the method for positioning of a target station (STA) by a radio access device. The method receives sounding feedback, from a target station (STA), for each of a plurality of subbands in response to sending a sounding signal, the sounding feedback comprising channel quality information for each subband of the plurality of subbands. The method calculates an angle-of-arrival (AoA) characteristic from the sounding feedback for at least a subset of the plurality of subbands and maps the AoA characteristics of the at least the subset of the plurality of subbands to a fingerprint in a fingerprint reference map. The method then determines the location of the target STA based on at least the fingerprint.

18 Claims, 9 Drawing Sheets

(51) Int. Cl.
*G01S 5/04* (2006.01)
*H04W 64/00* (2009.01)
*H04W 72/044* (2023.01)
*H04W 72/51* (2023.01)

(52) U.S. Cl.
CPC ............. *G01S 5/04* (2013.01); *H04W 64/006* (2013.01); *H04W 72/044* (2013.01); *H04W 72/51* (2023.01)

(58) Field of Classification Search
CPC ..... H04W 24/08; H04W 12/08; H04W 16/28; H04W 24/02; H04W 24/10; H04W 4/02; H04W 4/021; H04W 4/025; H04W 4/33; H04W 4/50; H04W 48/00; H04W 48/04; H04W 48/18; H04W 68/005; H04W 72/04; H04W 72/0446; H04W 72/0453; H04W 76/10; H04W 88/00; H04W 88/06; H04W 88/08; H04B 7/0617; H04B 7/06; H04B 17/309; H04B 17/318; H04B 7/0619; H04B 7/0626; H04B 1/38; H04B 17/12; H04B 17/21; H04B 17/24; H04B 17/27; H04B 17/3912; H04B 7/0404; H04B 7/0417; H04B 7/0452; H04B 7/0456; H04B 7/063; H04B 7/0639; H04B 7/0695; G01S 13/003; G01S 13/04; G01S 13/536; G01S 13/88; G01S 5/0215; G01S 5/0273; G01S 5/12; G01S 1/44; G01S 13/56; G01S 13/74; G01S 13/876; G01S 5/0205; G01S 5/0252; G01S 7/415; G01S 1/68; G01S 13/222; G01S 13/24; G01S 13/765; G01S 13/767; G01S 13/878; G01S 2013/466; G01S 2013/468; G01S 3/38; G01S 3/48; G01S 3/72; G01S 3/74; G01S 5/02; G01S 5/0247; G01S 5/0257; G01S 5/0263; G01S 5/14
See application file for complete search history.

(56) References Cited

U.S. PATENT DOCUMENTS

| | | | |
|---|---|---|---|
| 10,314,003 B2 | 6/2019 | Wang et al. | |
| 10,380,881 B2 | 8/2019 | Xu et al. | |
| 10,432,330 B2 | 10/2019 | Ghosh et al. | |
| 10,638,340 B2 | 4/2020 | Ghosh et al. | |
| 10,809,350 B2* | 10/2020 | Shu | G01S 5/0252 |
| 11,026,242 B2* | 6/2021 | Wigren | H04W 72/044 |
| 2009/0262673 A1 | 10/2009 | Hermersdorf | |
| 2010/0039315 A1* | 2/2010 | Malkos | G01S 19/48 342/357.43 |
| 2011/0250906 A1* | 10/2011 | Siomina | H04W 4/029 455/456.2 |
| 2011/0269452 A1* | 11/2011 | Roumeliotis | H04W 4/021 455/424 |
| 2012/0184286 A1* | 7/2012 | Richardson | H04W 64/00 455/456.1 |
| 2012/0214512 A1* | 8/2012 | Siomina | H04W 64/00 455/456.2 |
| 2013/0033999 A1* | 2/2013 | Siomina | H04W 64/00 370/252 |
| 2013/0084892 A1 | 4/2013 | Teyeb et al. | |
| 2013/0201848 A1* | 8/2013 | Kazmi | H04W 48/16 370/252 |
| 2014/0099970 A1* | 4/2014 | Siomina | G01C 21/165 455/456.1 |
| 2014/0327579 A1 | 11/2014 | Hart et al. | |
| 2015/0215793 A1 | 7/2015 | Siomina et al. | |
| 2016/0033613 A1 | 2/2016 | Hahn et al. | |
| 2016/0036541 A1* | 2/2016 | Siomina | H04W 24/10 455/422.1 |
| 2016/0057708 A1* | 2/2016 | Siomina | H04B 17/345 455/452.2 |
| 2016/0183116 A1* | 6/2016 | Zhang | G01C 21/206 455/456.1 |
| 2016/0205652 A1* | 7/2016 | Shu | H04W 64/00 455/456.1 |
| 2016/0358459 A1 | 12/2016 | Singhar et al. | |
| 2016/0381654 A1* | 12/2016 | Wigren | H04W 64/00 455/456.1 |
| 2017/0026798 A1 | 1/2017 | Prevatt | |
| 2017/0070854 A1 | 3/2017 | Poola et al. | |
| 2018/0014161 A1* | 1/2018 | Warren | G06F 16/24578 |
| 2018/0098196 A1* | 4/2018 | Dal Santo | G01S 5/02524 |
| 2018/0123751 A1 | 5/2018 | Narasimha et al. | |
| 2018/0184304 A1* | 6/2018 | Frenger | H04W 16/18 |
| 2018/0295601 A1 | 10/2018 | Wang et al. | |
| 2018/0365975 A1 | 12/2018 | Xu et al. | |
| 2019/0182793 A1 | 6/2019 | Wang et al. | |
| 2020/0053740 A1 | 2/2020 | Wigren et al. | |
| 2020/0100159 A1* | 3/2020 | Kang | H04W 76/14 |
| 2020/0241106 A1* | 7/2020 | Shu | G01S 5/0252 |
| 2022/0053285 A1* | 2/2022 | Shu | H04W 4/023 |

FOREIGN PATENT DOCUMENTS

| | | |
|---|---|---|
| WO | 2016193985 A1 | 12/2016 |
| WO | 2017100706 A1 | 6/2017 |
| WO | 2017155634 A1 | 9/2017 |
| WO | 2018101979 A3 | 6/2018 |

OTHER PUBLICATIONS

Bogdani et al., "Localization error modeling of hybrid fingerprint-based techniques for indoor ultra-wideband systems", Telecommunication Systems, Baltzer Science Publishers, val. 63, No. 2, Nov. 18, 2015.

Chapre et al., "CSI-MIMO: Indoor Wi-Fi Fingerprinting System", 39th Annual IEEE Conference on Local Computer Networks, IEEE, Sep. 8, 2014.

Li et al., "CSI-Based WiFi-Inertial State Estimation", 2016 IEEE International Conference on Multisensor Fusion and Integration for Interlligent Systems (MFI), Germany, Sep. 19-21, 2016.

Wigren, "Adaptive Enhanced Cell-ID Fingerprinting Localization by Clustering of Precise Position Measurements", IEEE Transactions on Vehicular Technology, vol. 56, No. 5, Sep. 2007.

* cited by examiner

FINGERPRINTING ENHANCEMENT WITH MULTI-BAND AoA MEASUREMENTS

RELATED APPLICATIONS

This application is a continuation of U.S. patent application Ser. No. 16/607,038, filed Oct. 21, 2019, granted as U.S. Pat. No. 11,026,242 on Jun. 1, 2021, which is a national stage application of International Patent Application No. PCT/IB2017/052321, filed Apr. 21, 2017, the disclosures of which are hereby incorporated herein by reference in their entirety.

TECHNICAL FIELD

Certain embodiments relate, in general, to wireless networks and, more particularly, to positioning of target stations using fingerprinting and angle-of-arrival (AoA) measurements in a Wi-Fi system.

BACKGROUND

Currently, the wireless fidelity (Wi-Fi) standardization organization, the IEEE, is focusing on indoor positioning. This is also the case in the 3GPP standards organization, where 5G requirements together with tightened E-911 positioning requirements can be expected to drive this development further. The current E-911 requirements for indoor positioning of a mobile device call for horizontal accuracy better than 50 meters and vertical accuracy better than 3 meters. Indoor positioning is one of the critical aspects in the roadmap of the development of both Wi-Fi and 5G positioning, based on which certain next generation features should be enabled, for example, internet of things (IoT).

Figure 1:
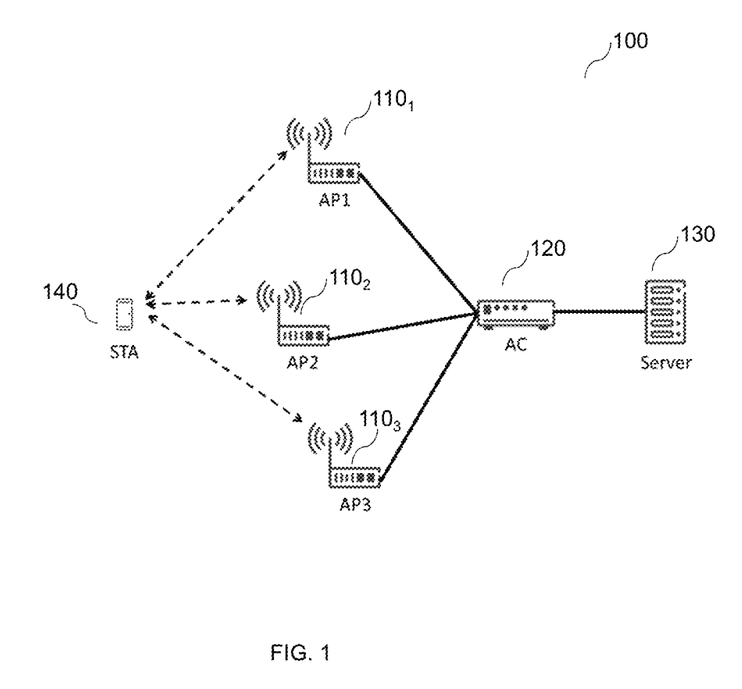
FIG. 1 illustrates an exemplary architecture of a Wi-Fi-based positioning system.

FIG. 1 illustrates an exemplary architecture of a Wi-Fi-based positioning system 100. This system incorporates one or more access points (APs) 110, an access controller (AC) 120 and a positioning server 130. The functions of each component are described as follows:

One or more APs 110 are utilized to exchange dedicated frames and/or beacons with wireless stations (STAs) 140 for positioning purposes. The frames/beacons contain positioning-related information, for example, time stamp, path loss information, etc., based on which STAs perform necessary measurements.

The AC 120 delivers configuration information to the AP(s) 110 to control their behaviors for positioning. In the opposite direction, the measurement results collected at the AP(s) 110 are reported to the AC 120. Then the AC 120 processes the measurement results and reports the processed data to the positioning server 130. In certain configurations, the APs 120 may also be able to report the collected data directly to the positioning server 130. The positioning server 130 calculates the location of the STA based on the reported data and other available information in the database.

Several techniques have been used for positioning in Wi-Fi systems. Those techniques exploit different signal features and thus, may require different measurements which are then applied to corresponding algorithms. The algorithms can be classified into the following categories:

Received Signal Strength Indicator (RSSI)

In the early versions of the IEEE 802.11 standard, the measurement of the distance-dependent signal strength, defined as RSSI, could be used to locate STAs 140. In principle, the distance between the STA 140 and the AP 110 could be reflected by RSSI based on a certain attenuation model. However, RSSI is sensitive to the radio environment and the behaviors of RSSI in practice could be greatly different from the model. Hence, RSSI is usually part of the fingerprinting method that searches for a best match between a stored geographical map of radio properties and the measured radio properties. RSSI is an important one among such radio properties.

Time of Arrival (TOA) and Round Trip Time (RTT)

The time measurement based methods measure the travel time between the STA 140 and the AP 110 and translate the travel time into the distance between the pair. In the Wi-Fi standard, the TOA method is supported by the 802.11 specification which has standardized the protocol and signalling for time-stamp (difference) measurement. For TOA positioning, there must be at least three such pairs so that the location can be determined at the intersection of the three circles created by the measured distances. In addition, given the TOA difference between STA-AP pairs, other trilateration-based algorithms, for example, hyperbolic trilateration, may also be applied. In such cases 2 hyperbolas are needed, however still 3 measurements are required to form the 2 observed time differences that define the hyperbolas.

Different from TOA, the round trip time (RTT) method can measure the distance without requiring time synchronization between the nodes. It measures the time spent by a specific frame in traveling from a transmitter to a receiver and back again to the transmitter. The main challenge is non-line of sight (NLOS) that brings uncertainty in the time measurement.

Fine Timing Measurement (FTM)

Since IEEE 802.11-2012, the standard has specified the use of timing measurement frames. A capable STA 140 may transmit timing measurement frames addressed to a peer STA/AP 140/110. The higher-layer protocol for synchronizing the local clock time between STAs 140 has been standardized as well.

In upcoming amendments to the standard, the feature of FTM is added. The FTM is characterized by a three-stage procedure including negotiation, FTM implementation and reporting the time-stamp of the previous FTM exchange. The time-stamp resolution is expected to improve to the order of 100 ps from that of 10 ns. This substantially increases the theoretical limitation of the positioning accuracy.

Wi-Fi Location Fingerprinting

Instead of determining the distance between the STA 140 and the AP 110, in the Wi-Fi fingerprinting method, the location of the user is determined by comparing the obtained sensing samples to a fingerprint map. The fingerprint map should be constructed in advance in an offline phase to collect necessary fingerprints, i.e. distinct sensing values including RSSI, TOA, etc., at each reference point in the map. The procedure of map construction usually requires a test STA 140 to perform reference measurements either at each point of a fine coordinate grid, or by "walking around" the AP coverage area to collect sufficient fingerprint data.

Fingerprinting positioning algorithms operate by creating a radio fingerprint for each point of a fine coordinate grid that covers a radio access network, e.g. AP 110. The fingerprint may e.g. consist of:

- The cell IDs that are detected by the terminal, in each grid point.
- Quantized path loss or signal strength measurements, with respect to multiple Wi-Fi nodes, performed by the terminal, in each grid point.
- Quantized RTT, in each grid point.
- Radio connection information like the radio access bearer (RAB), if applicable.

Whenever a position request arrives at the positioning method, a radio fingerprint is first measured, after which the corresponding grid point is looked up and reported. This of course requires that the point is unique.

Figure 2:
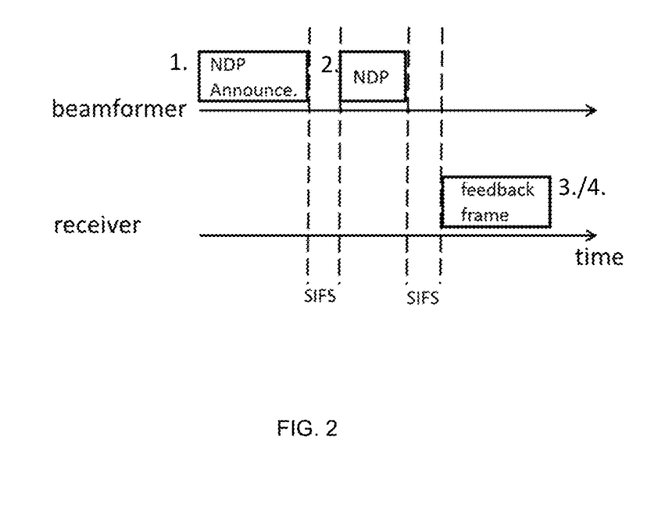
FIG. 2 illustrates a flowchart of a Wi-Fi sounding procedure for beamforming.

FIG. 2 illustrates a procedure for a Wi-Fi sounding procedure for beamforming. In 802.11ac standard, only "explicit" beamforming has been standardized, that is, beamforming requires explicit channel measurement by specific sounding frames. Beamforming depends on a channel calibration procedure to determine how to radiate energy in a desired direction. This channel sounding procedure for beamforming based on non-data packet (NDP) consists of the following major steps:

1. The beamformer first transmits a NDP Announcement frame that is used to gain control of the channel. The desired receiver, e.g. STA 140, will respond to it and other STAs will defer channel access in order not to interfere.

2. The beamformer then transmits a NDP frame, which is equivalent to a regular frame with the data part removed. Hence, this NDP mainly contains training signals through which the channel can be well estimated.

3. The receiver estimates the channel through the training part of the NDP frame and feeds back a very-high through-put (VHT) compressed beamforming frame that contains channel state information (CSI) between the beamformer and the receiver measured using the NDP. The VHT compressed beamforming frame provides a steering matrix compressed via a Givens rotation, which is able to save quite much overhead compared to no-compressed beamforming matrices.

4. Beamformer receives the feedback steering matrix and calculates the weighting matrix for beamforming.

Specially, the quantized information about the steering matrix is in a form of angles. To explain the details, consider a general MIMO model:

$$Y=Hx+n \quad \text{Eq. (1)}$$

By using singular value decomposition (SVD), the MIMO channel H can be decomposed into:

$$H=UDV^* \quad \text{Eq. (2)}$$

where U and V are both unitary matrices, and D is a diagonal matrix consisting of the singular values of H as its diagonal elements. In order to perform eigen-subspace beamforming, the matrix V needs to be fed back to the AP 100. In practice, due to the limited bit size in the feedback channel, V has to be quantized, and the AP receives a quantized version of V. By applying Given's rotation, the unitary matrix V can fully be described by only a few angles, as shown in Table 1 where the number of such angles is specified for different MIMO sizes. The number of angles corresponds to MIMO configuration M×N, i.e. the number of M transmitter antennas and the number of N receiver antennas. The details of the Given's rotation are not provided.

TABLE 1

Angles for compressed beamforming matrices

| M × N | Number of angles | Angles |
|---|---|---|
| 2 × 1 | 2 | $\Phi_{1,1}, \psi_{2,1}$ |
| 2 × 2 | 2 | $\Phi_{1,1}, \psi_{2,1}$ |
| 3 × 1 | 4 | $\Phi_{1,1}, \Phi_{2,1}, \psi_{2,1}, \psi_{3,1}$ |
| 3 × 2 | 6 | $\Phi_{1,1}, \Phi_{2,1}, \psi_{2,1}, \psi_{3,1}, \Phi_{2,2}, \psi_{3,2}$ |
| 3 × 3 | 6 | $\Phi_{1,1}, \Phi_{2,1}, \psi_{2,1}, \psi_{3,1}, \Phi_{2,2}, \psi_{3,2}$ |
| 4 × 1 | 6 | $\Phi_{1,1}, \Phi_{2,1}, \Phi_{3,1}, \psi_{2,1}, \psi_{3,1}, \psi_{4,1}$ |
| 4 × 2 | 10 | $\Phi_{1,1}, \Phi_{2,1}, \Phi_{3,1}, \psi_{2,1}, \psi_{3,1}, \psi_{4,1}, \Phi_{2,2}, \Phi_{3,2}, \psi_{4,2}$ |

TABLE 1-continued

Angles for compressed beamforming matrices

| M × N | Number of angles | Angles |
|---|---|---|
| 4 × 3 | 12 | $\Phi_{1,1}, \Phi_{2,1}, \Phi_{3,1}, \psi_{2,1}, \psi_{3,1}, \psi_{4,1}, \Phi_{2,2}, \Phi_{3,2}, \psi_{4,2}, \Phi_{3,3}, \psi_{4,3}$ |
| 4 × 4 | 12 | $\Phi_{1,1}, \Phi_{2,1}, \Phi_{3,1}, \psi_{2,1}, \psi_{3,1}, \psi_{4,1}, \Phi_{2,2}, \Phi_{3,2}, \psi_{4,2}, \Phi_{3,3}, \psi_{4,3}$ |

Furthermore, the angles $\phi$ are quantized between 0 and $2\pi$ and the angles $\psi$ are quantized between 0 and $\pi/2$, as given by:

$$\phi = \pi\left(\frac{1}{2^{b+2}} + \frac{k}{2^{b+1}}\right) k = 0, 1, \ldots, 2^{b+2} - 1$$

$$\psi = \pi\left(\frac{1}{2^{b+2}} + \frac{k}{2^{b+1}}\right) k = 0, 1, \ldots, 2^{b} - 1$$

where b+2 is the number of bits used to quantize $\phi$ and b is the number of bits used to quantize $\psi$. The maximum value of b is 4 and may be further expanded to 7 for the MU-MIMO case. At the AP side, given the quantized angle values contained in the sounding feedback, the beamforming/steering matrix can be reconstructed.

Angle of Arrival (AoA) is an example of "direction finding." AoA estimation exploits multiple antenna elements to measure the angle of arrival of radio waves impinging on the antenna array. AoA determines the direction of a radio wave by measuring the time difference of arrival at individual elements of the antenna array. Generally, this measurement is carried out by measuring the difference in received phase. In practice, there are numerous signal processing algorithms for estimating AoA, for example MUSIC, ESPRIT, and ROOT MUSIC algorithms.

There is no existing support for AoA in the current IEEE 802.11 specification. However, in the on-going IEEE 802.11az task group, one of the major tasks is to add AoA support for these types of "direction finding" applications in the upcoming new specification amendment.

Several problems are associated with any of the aforementioned positioning methods. In particular, current location fingerprinting algorithms operate based on a radio map, in which, at each reference point, a set of measurements is carried out in advance, denoted by a fingerprint. The fingerprint may consist of some of the measurements discussed above, e.g. cell ID, quantized path loss or signal strength measurements, with respect to multiple nodes, quantized RTT, radio connection information, etc. In practice, the real measurements may vary significantly due to for example time-varying wireless channel. These variations may compromise the positioning accuracy because the fingerprinting algorithms usually decide the location by searching for the reference point in which the radio characteristics most closely resemble the reference measurements.

SUMMARY

It is therefore desirable to provide a solution for improving positioning of mobile devices in a Wi-Fi target system, and particularly using multi-band AoA fingerprinting, to provide a better, more accurate, and more diverse radio measurement than existing solutions. The proposed solution provides a fingerprinting positioning method that incorporates multi-subband AoA measurements in fingerprinting algorithms as part of the radio characteristics. The proposed solution further incorporates a time measurement in the fingerprint, if needed, extending the fingerprint to include multi-subband AoA. Additionally, a fingerprinting method that is suitable to deploy as a single node positioning solution is also provided, which can build only on multiple AoA measurements, or be applied in combination with e.g. fine time measurement (FTM) in Wi-Fi APs 110 and/or ACs 120, as well as in Wi-Fi positioning nodes 130.

Several advantages are provided by the proposed solution. For example, the proposed solution can significantly improve the positioning accuracy of fingerprinting location algorithms by using multiple AoA measurements. Further, in contrast to path loss or RSSI measurement positioning methods, AoA measurements are hardly affected by the time-varying channel. Another advantage is that the proposed solution can be implemented in the existing Wi-Fi system without requiring any hardware modifications. Additionally, a stand-alone embodiment of the fingerprinting position solution, e.g. one that only uses multiple AoA measurements with time measurements as fallback, is suitable for implementation in single Wi-Fi AP, or few Wi-Fi APs, deployments, that are common for small businesses.

According to a first aspect, a method for positioning of a target station (STA) by a radio access device is provided. In an embodiment of the first aspect, the method receives sounding feedback, from a target station (STA), for each of a plurality of subbands in response to sending a sounding signal, the sounding feedback comprising channel quality information for each subband of the plurality of subbands. The method further calculates an angle-of-arrival (AoA) characteristic from the sounding feedback for at least a subset of the plurality of subbands, and maps the AoA characteristics of the at least the subset of the plurality of subbands to a fingerprint in a fingerprint reference map. The method then determines the location of the target STA based on at least the fingerprint. In a second embodiment of the first aspect, mapping the characteristics of the at least the subset of the plurality of subbands to the fingerprint comprises, determining the AoA estimate in the fingerprint reference map that most closely matches the AoA characteristics. In a third embodiment of the first aspect, determining the location of the target STA based on at least the fingerprint comprises, determining the reference location associated with the mapped fingerprint. In a fourth embodiment of the first aspect, determining the location of the target STA further comprises using a time measurement when the fingerprint does not uniquely identify the location of the target STA. In a fifth embodiment of the first aspect, the radio access device is an access point (AP) in a wireless fidelity (Wi-Fi) network with beamforming.

In a second aspect, a radio access device for positioning of a target station (STA) by a radio access device is provided. In an embodiment of the second aspect, the radio access device comprises an interface for receiving sounding feedback from a target station (STA) for each of a plurality of subbands, in response to sending a sounding signal, the sounding feedback comprising channel quality information for each subband of the plurality of subbands. The radio access device further comprises processing circuitry configured to calculate an angle-of-arrival (AoA) characteristic from the sounding feedback for at least a subset of the plurality of subbands, and map the AoA characteristics of the at least the subset of the plurality of subbands to a fingerprint in a fingerprint reference map. The processing circuitry is further configured to determine the location of the target STA based on at least the fingerprint. In a second embodiment of the second aspect, mapping the characteristics of the at least the subset of the plurality of subbands to the fingerprint comprises, the processing circuitry determining the AoA estimate in the fingerprint reference map that most closely matches the AoA characteristics. In a third embodiment of the second aspect, determining the location of the target STA based on at least the fingerprint comprises, the processing circuitry determining the reference location associated with the mapped fingerprint. In a fourth embodiment of the second aspect, determining the location of the target STA further comprises the processing circuitry using a time measurement when the fingerprint does not uniquely identify the location of the target STA. In a fifth embodiment of the second aspect, the radio access device is an access point (AP) in a wireless fidelity (Wi-Fi) network with beamforming.

In a third aspect, a radio access device for positioning of a target station (STA) by a radio access device is provided. In an embodiment of the third aspect, the radio access device comprises a processing circuitry comprising a memory and a processor, the memory having instructions. The processor, when executing the instructions, causes the radio access device to receive sounding feedback from a target station (STA) for each of a plurality of subbands, in response to sending a sounding signal, the sounding feedback comprising channel quality information for each subband of the plurality of subbands. The processor, when executing the instructions, further causes the radio access device to calculate an angle-of-arrival (AoA) characteristic from the sounding feedback for at least a subset of the plurality of subbands, and map the AoA characteristics of the at least the subset of the plurality of subbands to a fingerprint in a fingerprint reference map. The processor, when executing the instructions, further causes the radio access device to determine the location of the target STA based on at least the fingerprint.

In a fourth aspect, a computer program is provided. The computer program comprises instruction which when executed by a process, cause the radio access device to perform the method according to the first aspect and any of its embodiments.

It is to be noted that any feature of any of the embodiments disclosed herein may be applied to any other embodiment, wherever appropriate. Likewise, any advantage of any of the embodiments may apply to the other embodiments, and vice versa. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

Some of the embodiments contemplated herein will now be described more fully hereinafter with reference to the accompanying drawings. Other embodiments, however, are contained within the scope of this disclosure and the invention should not be construed as limited to only the embodiments set forth herein; rather, these embodiments are provided by way of example to help convey the scope of the inventive concept to those skilled in the art. If used, like numbers refer to like elements throughout the description.

As noted above, with tightening E-911 positioning requirements for mobile devices, improving positioning of mobile devices on indoor Wi-Fi systems is of particular importance. Indoor environments may include, for example, multi-story office buildings, sports and entertainment stadiums, conference centers, and other large venues, as well, as small businesses and even individual homes and apartment buildings, all of which would benefit from a more precise positioning for locating a mobile device within the space. Certain embodiments of the present disclosure may provide improvements in mobile device positioning in a Wi-Fi environment, especially indoor positioning.

The proposed solution provides a general fingerprinting positioning method that incorporates multi-subband AoA measurements in the fingerprinting. The set of AoA measurements at each reference point can serve as a signature of a corresponding radio characteristic. The procedures for radio map surveying with multi-subband AoA measurements are also provided.

In an embodiment of the proposed solution, Angle of Arrival (AoA) estimates associated with each subband are incorporated into necessary measurements of a fingerprint when using fingerprinting positioning algorithms. A subband represents a portion of the available frequency band for transmitting signals from transmitter, e.g. AP 110, to a receiver, e.g. STA 140. A subband may be further comprised of multiple subcarriers. When a transmitter transmits the same signal from multiple antennas or antenna elements, and/or from different directions via beamforming, to a receiver, each of the different signals may be transmitted on the same or different subbands of the available frequency, as determined by the transmitter based on, e.g. radio characteristics, signal quality reported by the receiver, etc.

STA 140 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, in a Wi-Fi system. AP 110 is a type of radio access device in a Wi-Fi system, which transmits and receives signals to STA 140.

As illustrated in Table 2, for example, the feedback for each subband is labelled with one or multiple AoA estimates, which can be used as one of the signatures of the radio characteristic at each point of a fine coordinate grid.

TABLE 2

Example AoA estimates associated with each subband.

| Subband index | AoA estimates |
|---|---|
| 1 | $a_{1,1}, a_{1,2} \cdots$ |
| 2 | $a_{2,1}, a_{2,2} \cdots$ |
| 3 | $a_{3,1}, a_{3,2} \cdots$ |
| $\cdots$ | $\cdots$ |
| m | $a_{m,1}, a_{m,2} \cdots$ |

In exemplary Table 2, AoA estimates are associated with each subband. For example, each subband 1 to m may be associated with AoA estimates of antenna elements in an antenna array. For example, subband 1 may have AoA estimates $(a_{1,1})$, $(a_{1,2})$, etc. Subband 2 may have AoA estimates $(a_{2,1})$, $(a_{2,2})$, etc. Subband m may have AoA estimates $(a_{m,1})$, antenna element 2 $(a_{m,2})$, etc. In some embodiments, a subband may have fewer associated AoA estimates than the number of antenna elements in the array, and in other embodiments, one or more subbands may have no associated AoA estimates.

Figure 5:
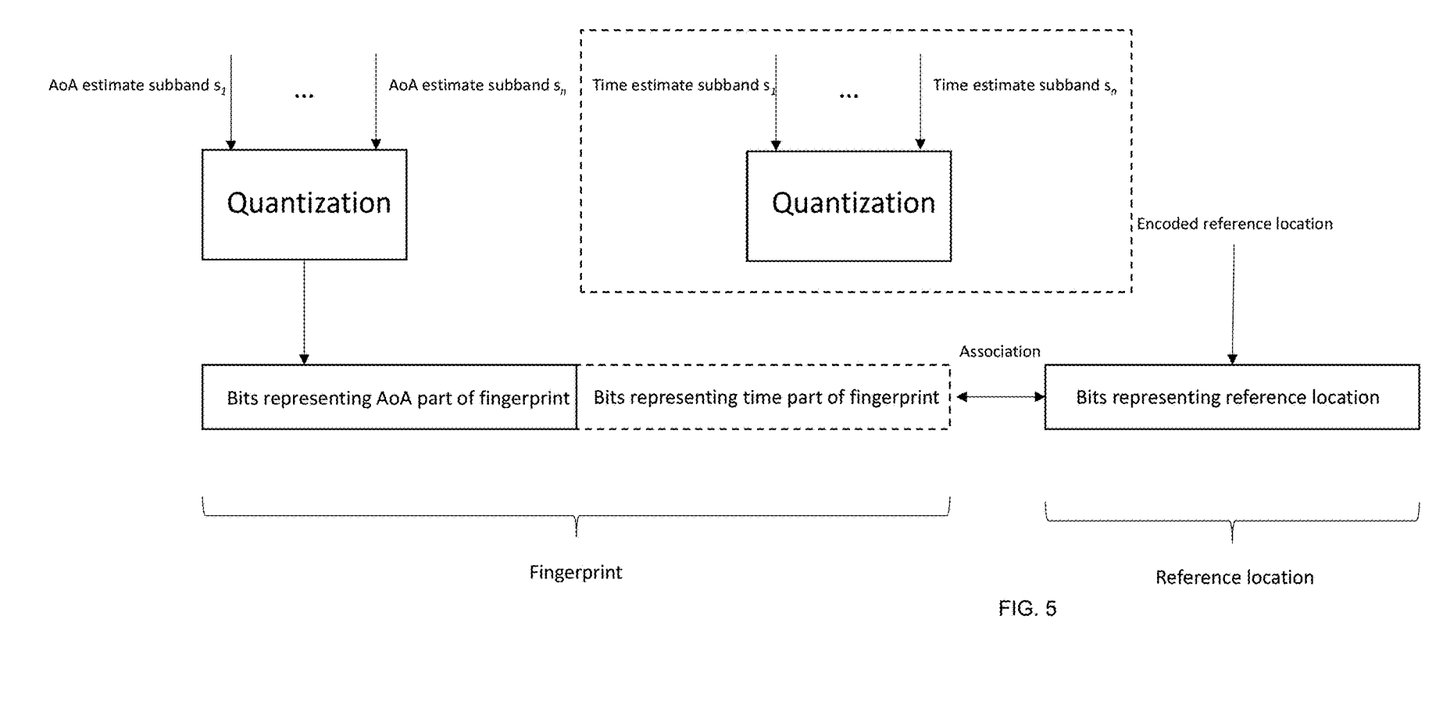
FIG. 5 illustrates an embodiment of generating a fingerprint according to the proposed fingerprinting enhancement with multi-band AoA.

In an embodiment of the proposed solution, to locate an STA 140 in a Wi-Fi system, an AP 110, receives sounding feedback from a target STA. The sounding feedback includes AoA measurements for each subband, or for a subset of the subbands, such as depicted in Table 2. The AP processes the sounding feedback, along with other existing measurements, and calculates the AoA characteristics for each subband. After the AoA characteristics are calculated at the AP, as part of a fingerprinting algorithm, a fingerprinting database is searched for the reference location of the STA. The reference location is determined according to the AoA characteristic which most closely resembles the obtained AoA estimates. In one typical embodiment the fingerprint is stored as a coded number, as depicted in FIG. 5. The terminology "most closely" could then be interpreted as a generalized measure of distance, between the measured fingerprint and the ones in the data base. The distance measure operates on the AoA part of the fingerprint, Typically, such a distance measure could be the magnitude of the difference in the numerical values of an AoA represented by the bits of the AoA part of the fingerprint. In case of multiple AoAs being a part of the fingerprint, the above magnitude could be replaced by a sum of magnitudes (of AoA differences).

In another embodiment, only a subset of AoA estimates that corresponds to a subset of the subbands may be used for fingerprinting. The selection of the subset of subbands may be based on for example the mean signal-to-noise ratio (SNR) values measured by the STA on the subbands or subcarriers. Alternatively, average SNR on each subband or subcarrier may also be obtained through STA sounding feedback. For example, in a simple embodiment, the AP node may only consider the AoA estimates associated with the top n subbands having the highest average SNR, where n is a number less than the total m subbands. The procedure of subband selection at the AP may be transparent to the STA devices.

The fingerprinting database comprises fingerprinted positions that define locations of a mapped area, which may be referred to as a radio map. Each fingerprinted position in the radio map is associated with fingerprinted reference measurements. The fingerprinting database is accessed by a fingerprinting algorithm during a device positioning operation. The fingerprinting database may be generated in one of several ways.

In one embodiment, the fingerprinted positions, i.e. the radio map, may be generated by performing an extensive surveying operation that performs fingerprinting radio measurements repeated for all coordinate grid points (referred to as a fine grid). The generation of the fingerprinted positions is not limited to the fine grid approach. For example, other approaches to capturing radio measurements and generating fingerprinted positions may be used when creating a radio map. In any of the approaches utilized for generating the database of fingerprinted conditions, the collection of fingerprints usually relies on the reference measurements performed through a test STA.

Figure 3:
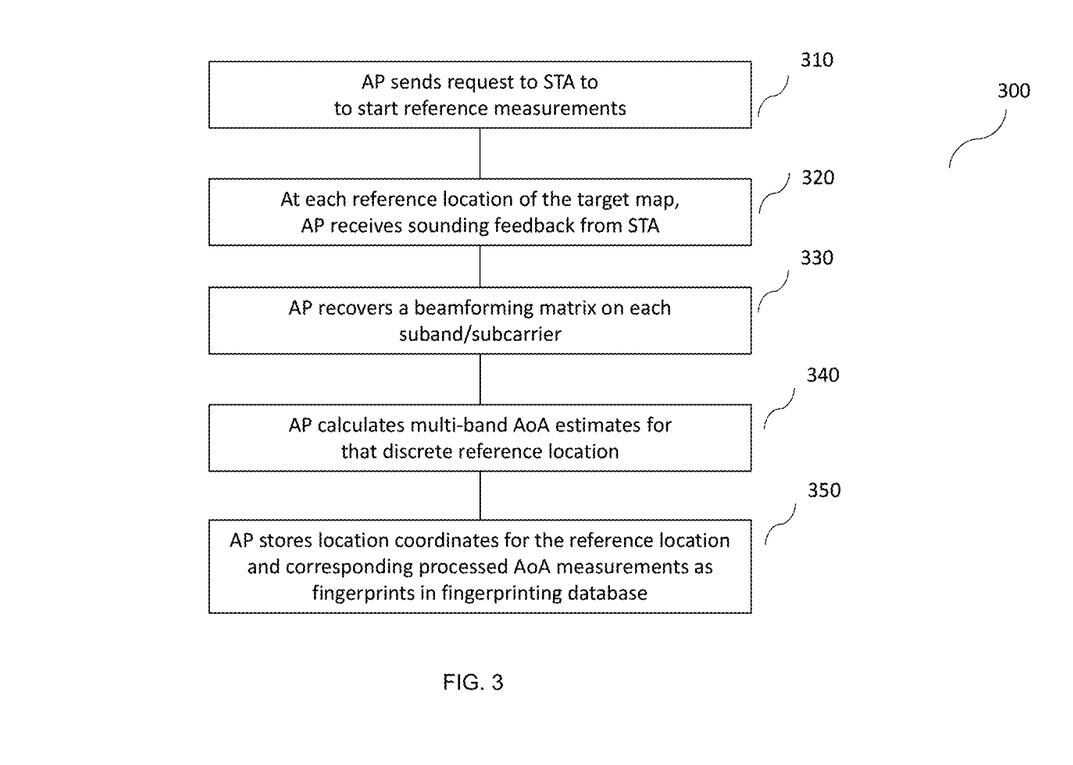
FIG. 3 is a flowchart of a method for generating fingerprints for reference locations according to the proposed fingerprinting enhancement with multi-band AoA.

FIG. 3 is a flowchart of an embodiment of a method 300 for generating positioning fingerprints for reference locations of a radio map. The method comprises measuring multi-subband AoA characteristics with a test STA to generate reference measurements for fingerprinting locations of a target area. In step 310, the test STA receives a request from the AP to start reference measurements for a target area. In one embodiment, using a "walk around" mode, the test STA is moved or walked through the target area, which may be, for example, the interior of a multi-story building. This target area, however, is not limited to indoor environments and may be performed for any target location for which a radio map generation is desired. In another embodiment, a "deterministic" mode is used in which the test STA is positioned manually according to the given reference map.

At step 320, at each reference location of the target map, the AP receives sounding feedback provided from the STA. At step 330, the AP recovers a beamforming matrix on each subband/subcarrier. At step 340, the AP calculates the multiband AoA estimates for that discrete reference location. At step 350, the AP stores the location coordinates for the reference location and the corresponding processed AoA measurements as fingerprints in the fingerprinting database. There may be further processing performed on the obtained AoA measurements for each reference location when generating the fingerprint for that reference location. For example, the AP may select only a portion of the AoA measurements on particular subbands.

In an embodiment of method 300, the AP may communicate with a central node, for example, a location or positioning server, and send the obtained fingerprints (i.e. the processed AoA measurements and test AP location coordinates) that will be stored at the central node. As previously noted, this procedure is performed in advance using a test STA and test AP to generate the fingerprinting database (or radio map) to be used for device positioning in a live environment, e.g. for E-911 positioning. Once the fingerprinting database is generated, it may be stored locally at a stand-alone AP in a central node, e.g. a location or positioning server, for use with a positioning algorithm in a live environment.

Figure 4A:
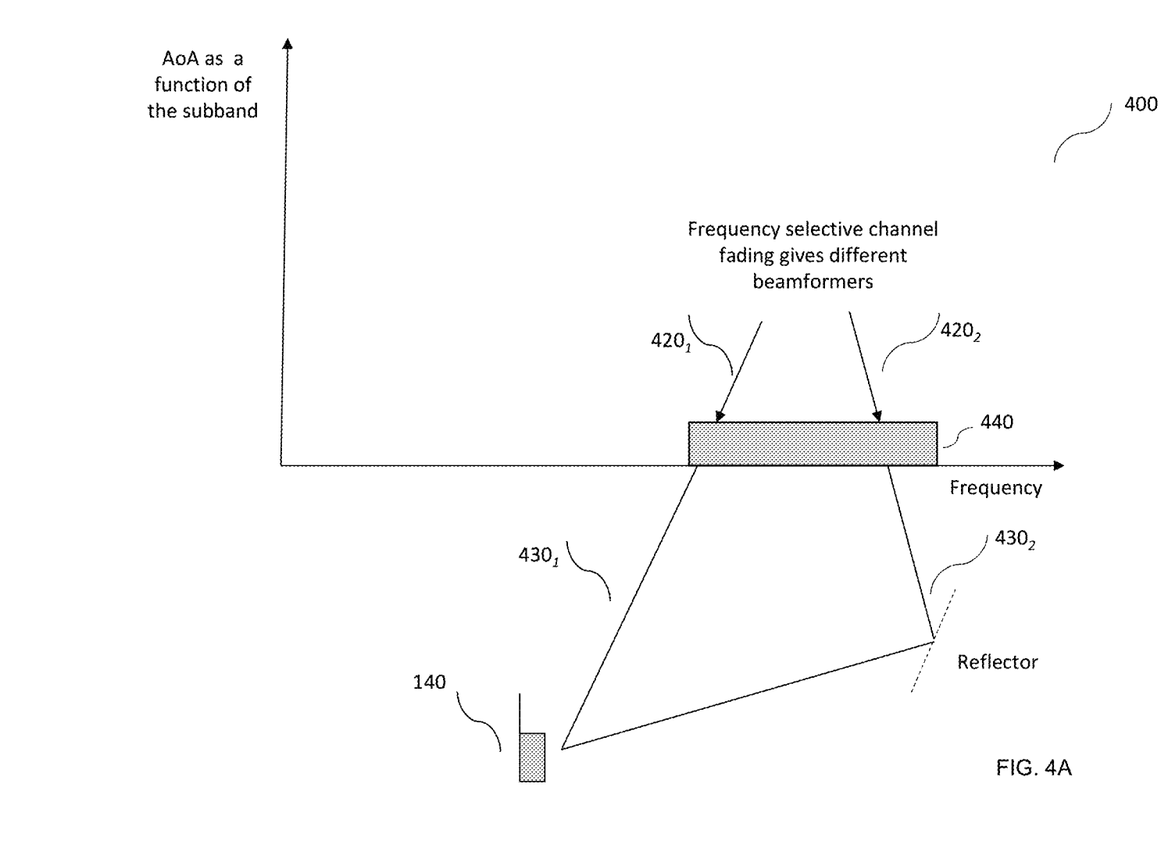
FIGS. 4A and 4B illustrate embodiments of a stand-alone AP according to the proposed fingerprinting enhancement with multi-band AoA.
Figure 4B:
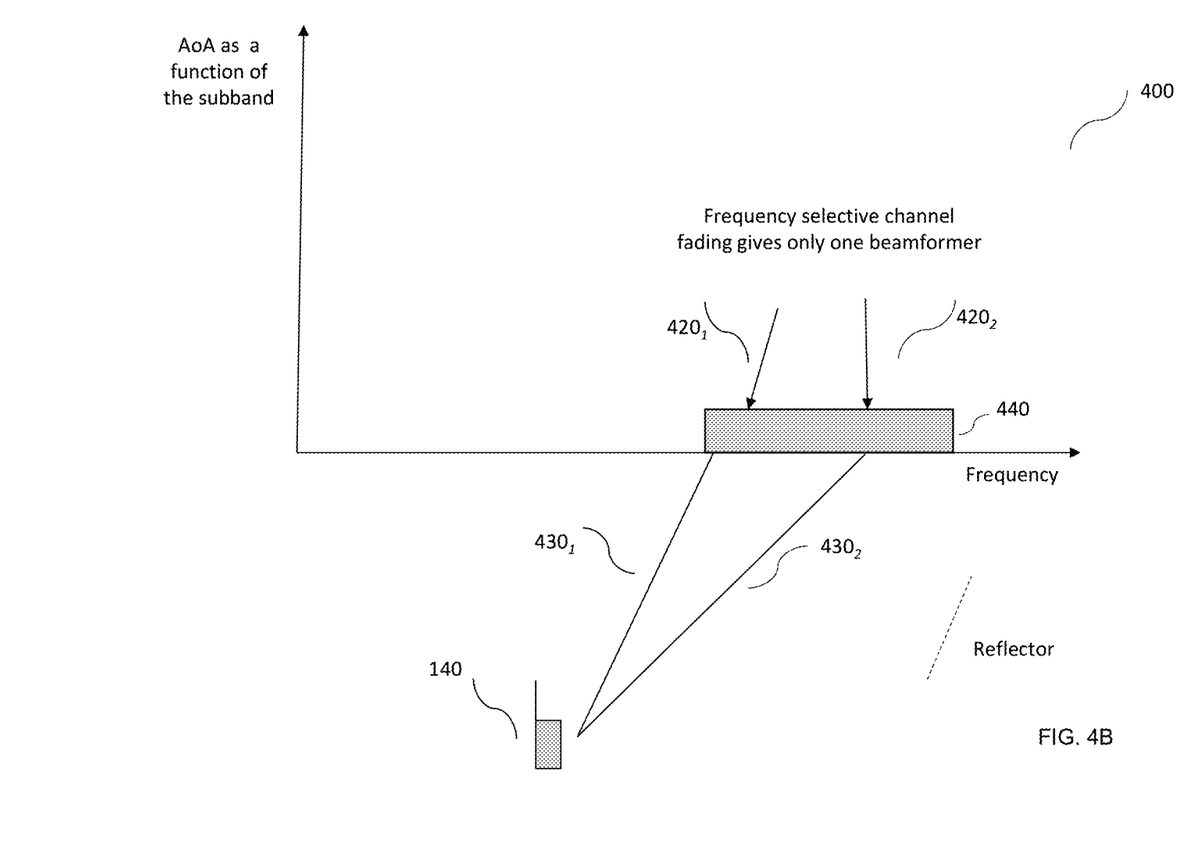

FIGS. 4A and 4B illustrate embodiments of positioning methods using multiple AoA performed in a stand-alone AP, and further using time fingerprinting positioning. FIG. 4A, for example, illustrates an embodiment of a positioning method 400 in which a unique location, e.g. a unique Cartesian position, can be determined from multiple AoA. In this embodiment, frequency selective channel fading, e.g. as a result of the mobility of the STA, gives different beamformers for different subbands. Further in this embodiment, an AP operates on a Wi-Fi carrier with beamforming 440, and generates two different signals to STA 140 using different beamformers. However, the solution is not limited to two beamformers, and may support multiple beamformers which is dependent on the configuration of the AP. In this example, the beamforming produces different signals with different directionality, i.e. transmission rays $430_{1,2}$. In this embodiment, the different beamformers select different subbands for transmitting the respective signals. The AP gets feedback indicating different beamformers $420_{1,2}$ in different subbands, with these beamformers corresponding to different AoAs. In this case, the AoA associated with each beamformer may be considered a function of a subband. As shown in FIG. 4A, since both transmission rays $430_{1,2}$ from the AP terminate at the STA location, it is clear that the Cartesian STA location may be characterized by the two AoAs associated with the transmission rays $430_{1,2}$. Locally, this would provide a unique localization for the STA. This follows since in another embodiment, when the STA may move toward the AP, the beamformer would also need to change in order to arrive at the STA antenna, thus again providing a unique localization for the STA based on the new AoAs.

FIG. 4B illustrates an embodiment in of a positioning method 400 in which a unique location, e.g. a unique Cartesian position, cannot be determined from multiple AoA. In this example, the different subbands receive feedback from the STA 140 corresponding to the same beamforming direction, i.e. AoA, associated with each transmission ray $430_{1,2}$. In this instance, STA movement toward the AP may not change the beamforming direction, i.e. AoA may be the same for each beamformer and associated subband(s). Therefore, in the embodiment of FIG. 4B, there may be no unique Cartesian location associated with the AoA feedback information from the STA.

As illustrated in the embodiments of FIGS. 4A and 4B, multiple AoA measurements may or may not provide a unique Cartesian location. In the case where a Cartesian location of the STA may not be unique as in FIG. 4B, an alternative embodiment of a positioning method may be utilized in which a time measurement corresponding to the distance to the STA may be made be a part of the location fingerprint. In particular, the proposed solution of extending a location fingerprint to include multiple AoA, may be modified further to extend the location fingerprint to include a time measurement, if needed. When the location fingerprint is extended to include a time measurement, an additional surveying step is required when establishing the fingerprinting database, i.e the radio map, that will associate Cartesian locations with fingerprints in a more or less unique way according to time measurement.

In some embodiments, non-uniqueness of a location may be addressed by applying certain algorithms to compute a region bounded by a polygon where a certain fingerprint pre-vails. This property is known in prior art, such that the more non-uniqueness, e.g. as illustrated by FIG. 4B, the larger the computed regions will become. The reason for larger regions is because the computation of the regions is performed so as to result in a pre-specified probability that the STA is actually in the computed region given the associated fingerprint.

FIG. 5 illustrates generation of a fingerprint in a fingerprint reference map. In an embodiment, the sounding feedback is received from a test STA from a reference location. The feedback may comprise AoA estimates for subbands $s_1$-$s_n$. The AoA estimates are processed, e.g. quantized, and a fingerprint is generated which may, in some embodiments, be in the form of bits representing the AoA portion of the fingerprint for that reference location. In other embodiments, when a time measurement may be optionally included in the fingerprint, the sounding feedback may include time estimates for subbands $s_1$-$s_n$. The time measurements are also quantized and another portion of the fingerprint is generated, which may be in the form of bits representing the time part of the fingerprint. The reference location for which the AoA estimates, and optionally, the time estimates, are associated, is encoded, which may also be in the form of bits representing the reference locations. In some embodiments, the reference location corresponds to a location of a Cartesian coordinate grid. An association is them made between the fingerprint and the reference location or reference point in the fingerprint reference map, i.e. radio map.

The fingerprint reference map is thus populated by repeating the above steps for each reference location of the map. When completed, the fingerprint reference map comprises a plurality of location coordinates, a plurality of fingerprints, and an association of each of the plurality of fingerprints with at least one of the plurality of location coordinates representing a reference location.

In some embodiments, a fingerprint in the fingerprinting reference map comprises a representation of corresponding AoA estimates for a plurality of subbands for a reference location. In other embodiments, the fingerprint comprises at least the subset of the plurality of subbands for a reference location. That is, not all AoA subband estimates may be included in the fingerprint for a reference location.

Figure 6:
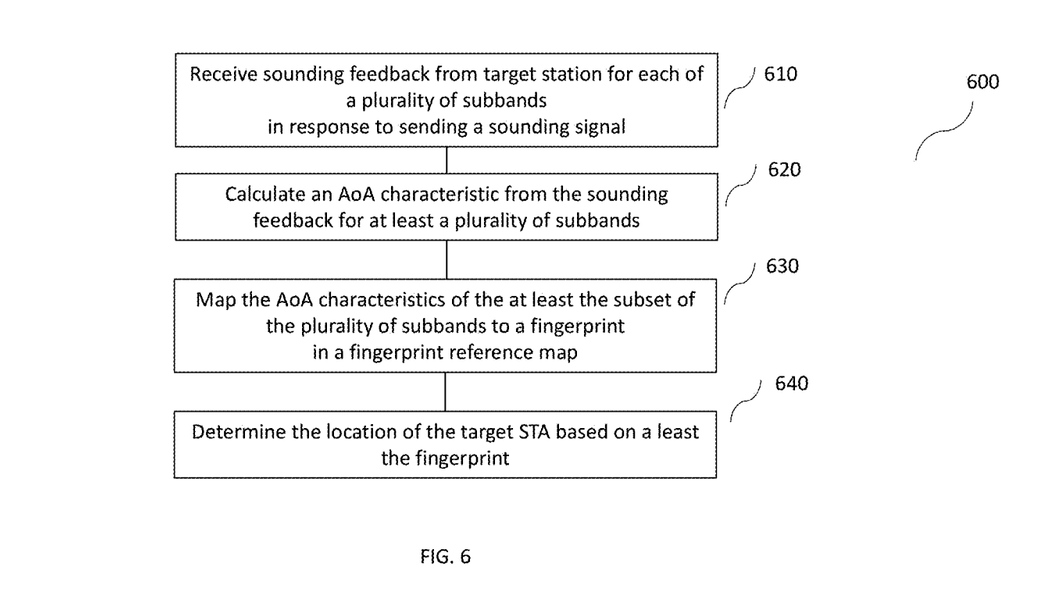
FIG. 6 is a flowchart of an embodiment of location positioning according to the proposed fingerprinting enhancement with multi-band AoA.

FIG. 6 illustrates an embodiment of a method 600 for location positioning of a wireless device by a radio access device. At step 610, the radio access device receives a sounding feedback from a target station (STA) for each of a plurality of subbands in response to sending a sounding signal, the sounding feedback comprising channel quality information for each subband of the plurality of subbands. In step 620, the radio access device calculates an angle-of-arrival (AoA) characteristic for each subband based on the sounding feedback in at least a subset of the plurality of subbands. At step 630, the radio access device maps the AoA characteristics calculated of the at least the subset of the plurality of subbands to a location fingerprint in a fingerprint reference map. In some embodiments, mapping the AoA characteristics comprises determining the AoA estimate in the fingerprint reference map that most closely matches the AoA characteristics. As previously discussed, in one typical embodiment the fingerprint is stored as a coded number, as depicted in FIG. 5. The terminology "most closely" could then be interpreted as a generalized measure of distance, between the measured fingerprint and the ones in the data base. The distance measure operates on the AoA part of the fingerprint, Typically, such a distance measure could be the magnitude of the difference in the numerical values of an AoA represented by the bits of the AoA part of the fingerprint. In case of multiple AoAs being a part of the fingerprint, the above magnitude could be replaced by a sum of magnitudes (of AoA differences).

At step 640, the radio access device determines the location of the target STA based on at least the fingerprint. In some embodiments, determining the location of the target STA comprises determining the reference location associated with the mapped fingerprint.

In other embodiments, determining the location of the target STA comprises using a time measurement when the fingerprint does not uniquely identify the location of the target STA. The time measurement may be a round-trip time (RTT). In yet other embodiments, determining the location of the target STA may be based on any one or more additional measurements, which may be included as an optional part of the signaling message for positioning, e.g. in the sounding feedback. Some examples of additional optional measurements include Global Positioning System (GPS), air pressure and air temperature measurements, hazardous gas (e.g. $CO_2$, CO, $O_2$, $CH_4$, or HCN level indications), and boundary clock markings so that RTT may be precisely calculated to nano-second resolution.

Figure 7A:
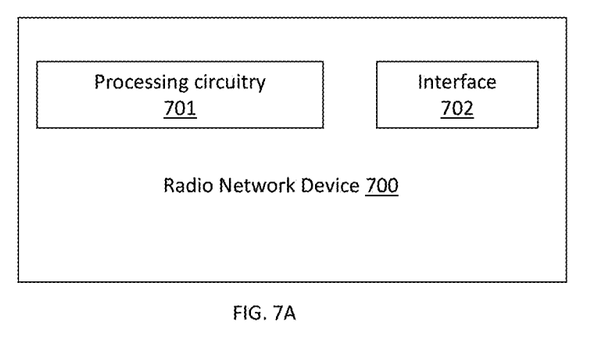
FIG. 7A-7C illustrate alternative embodiments of a radio access device according to the proposed fingerprinting enhancement with multi-band AoA.

An exemplifying embodiment of a radio access device is illustrated in a general manner in FIG. 7A. The radio access device 700 is configured to perform at least one of the method embodiments described above, e.g. method 600 of FIG. 6. The radio access device 700 is associated with the same technical features, objects and advantages as the previously described method embodiments.

The radio access device may be implemented and/or described as follows:

The radio access device 700 comprises processing circuitry 701, and one or more communication interfaces 702. For example, the communication interface 702 may comprise one or more interfaces for transmitting one or more communications/signals with beamforming on a set of subbands or subcarriers. The one or more interfaces of communication interface 702 may also receive wireless communications from other devices, e.g. sounding feedback comprising AoA estimates, and optionally, time estimates, from an STA. The processing circuitry may be composed of one or more parts which may be comprised in one or more nodes in the communication network, but is here illustrated as one entity.

The processing circuitry 701 is configured to cause the radio access device 700 to receive sounding feedback, from a target station, e.g. STA 140, for each of a plurality of subbands in response to sending a sounding signal, the sounding feedback comprising channel quality information for each subband of the plurality of subbands. The processing circuitry 701 is further configured to calculate an angle-of-arrival (AoA) characteristic from the sounding feedback for at least a subset of the plurality of subbands, and to map the AoA characteristics of the at least the subset of the plurality of subbands to a fingerprint in a fingerprint reference map. The processing circuitry 701 is further configured to determine the location of the target STA based on at least the fingerprint.

Figure 7B:
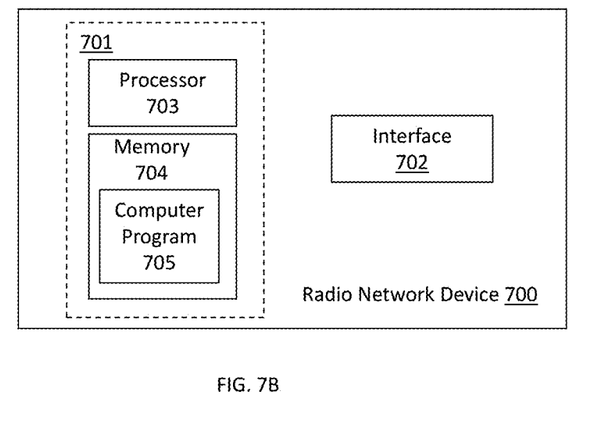

The processing circuitry 701 may, as illustrated in FIG. 7B, comprise one or more processing means, such as a processor 703, and a memory 704 for storing or holding instructions. In an embodiment of FIG. 7B, the memory may comprise instructions, e.g. in form of a computer program 705, which when executed by the one or more processors 703 causes the radio access device 700 to perform the actions and methods described above, e.g. the method of FIG. 6.

Figure 7C:
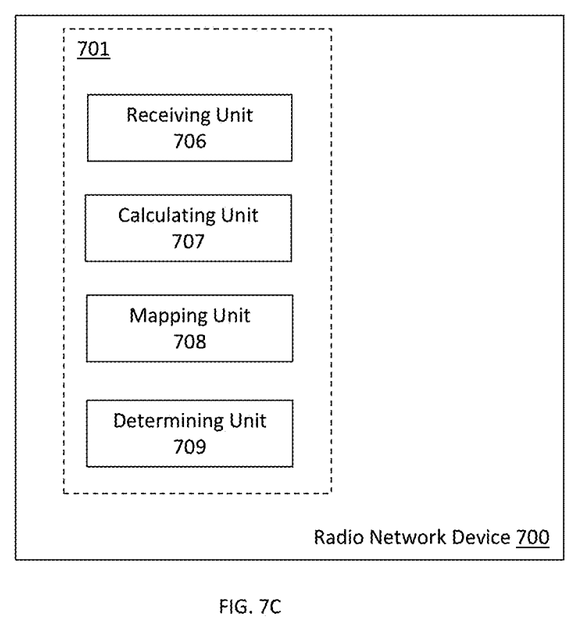

An alternative implementation of the processing circuitry 701 is shown in FIG. 7C. The processing circuitry 703 comprises a receiving unit 706, configured to cause the radio access device to receive sounding feedback, from a target station, e.g. STA 140, for each of a plurality of subbands in response to sending a sounding signal, the sounding feedback comprising channel quality information for each subband of the plurality of subbands. The processing circuitry 701 may further comprise a calculating unit 707, configured to calculate an angle-of-arrival (AoA) characteristic from the sounding feedback for at least a subset of the plurality of subbands, and a mapping unit 708, configured to map the AoA characteristics of the at least the subset of the plurality of subbands to a fingerprint in a fingerprint reference map. The processing circuitry 701 may further comprise a determining unit 709, configured to determine the location of the target STA based on at least the fingerprint.

The steps, functions, procedures, modules, units and/or blocks described for the radio access device herein may be implemented in hardware using any conventional technology, such as discrete circuit or integrated circuit technology, including both general-purpose electronic circuitry and application-specific circuitry.

Alternatively, at least some of the steps, functions, procedures, modules, units and/or blocks described above may be implemented in software such as a computer program for execution by suitable processing circuitry including one or more processing units. The software could be carried by a carrier, such as an electronic signal, an optical signal, a radio signal, or on a non-transitory computer readable storage medium before and/or during the use of the computer program e.g. in one or more nodes of the wireless communication network.

The flow diagram or diagrams presented herein may be regarded as a computer flow diagram or diagrams, when performed by one or more processors. A corresponding radio access device or apparatus may be defined as a group of function modules, where each step performed by a processor corresponds to a function module. In this case, the function modules are implemented as one or more computer programs running on one or more processors.

Examples of processing circuitry 700 of a radio access device may include, but is not limited to, a combination of one or more of a microprocessor, controller, microcontroller, central processing unit (CPU), digital signal processor (DSP), application specific integrated circuit (ASIC), field programmable gate array (FPGA), Programmable Logic Controllers (PLCs), or any other suitable computing device, resource, or combination of hardware, software and/or encoded logic operable to provide, either alone or in conjunction with other components, such as memory 704, the functionality of the radio access device 700. That is, the units or modules in the arrangements in the communication network described above could be implemented by a combination of analog and digital circuits in one or more locations, and/or one or more processors configured with software and/or firmware, e.g. stored in a memory. One or more of these processors, as well as the other digital hardware, may be included in a single application-specific integrated circuitry, ASIC, or several processors and various digital hardware may be distributed among several separate components, whether individually packaged or assembled into a system-on-a-chip, SoC.

The memory 704 may comprise any form of volatile or non-volatile computer, or non-transitory computer readable media including, without limitation, persistent storage, solid state memory, remotely mounted memory, magnetic media, optical media, random access memory (RAM), read-only memory (ROM), removable media, or any other suitable local or remote memory component. Memory 704 may store any suitable instructions, data or information, including software and encoded logic, to be executed by the processing circuitry 701 so as to implement the above-described functionalities of the radio access device 700. Memory 704 may be used to store any calculations made by processor 703 and/or any data received via interface.

It should also be understood that it may be possible to re-use the general processing capabilities of any conventional device or unit in which the specific proposed technology is implemented. It may also be possible to re-use existing software, e.g. by reprogramming of the existing software or by adding new software components in order to implement the specific features of the proposed technological solution.

The embodiments described above are merely given as examples, and it should be understood that the proposed technology is not limited thereto. It will be understood by those skilled in the art that various modifications, combinations and changes may be made to the embodiments without departing from the present scope. In particular, different part solutions in the different embodiments can be combined in other configurations, where technically possible.

When using the word "comprise" or "comprising" it shall be interpreted as non-limiting, i.e. meaning "consist at least of".

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

What is claimed is:

1. A method for positioning of a target station (STA) by a radio network device, the method comprising:

receiving sounding feedback, from a target station (STA), for each of a plurality of subbands in response to sending a sounding signal, the sounding feedback including angle-of-arrival (AoA) measurements for each subband of the plurality of subbands;

calculating an AoA characteristic from the sounding feedback for at least a subset of the plurality of subbands;

mapping the AoA characteristics of the at least the subset of the plurality of subbands to a fingerprint in a fingerprint reference map;

determining a location of the target STA based on at least
the fingerprint and
a hazardous gas; and the determining the location of the target STA including using a time measurement based on the fingerprint not uniquely identifying the location of the target STA.

2. The method of claim 1, wherein the fingerprint reference map comprises a plurality of location coordinates, a plurality of fingerprints, and an association of each of the plurality of fingerprints with at least one of the plurality of location coordinates representing a reference location.

3. The method of claim 1, wherein the fingerprint in the fingerprint reference map comprises a representation of corresponding AoA estimates for the at least the subset of the plurality of subbands for a reference location.

4. The method of claim 1, wherein the fingerprint reference map is based on AoA estimates for at least the subset of the plurality of subbands, and
wherein mapping the AoA characteristics of the at least the subset of the plurality of subbands to the fingerprint comprises, determining the AoA estimate in the fingerprint reference map that most closely matches the AoA characteristics.

5. The method of claim 1, wherein determining the location of the target STA based on at least the fingerprint comprises, determining the reference location associated with the mapped fingerprint.

6. The method of claim 2, wherein the reference location corresponds to a location of a Cartesian coordinate grid.

7. The method of claim 1, wherein the time measurement is a round-trip time (RTT) measurement.

8. The method of claim 1, wherein determining the location of the target STA is further based on:
Global Positioning System (GPS) measurements.

9. The method of claim 1, wherein the radio access device is an access point (AP) in a wireless fidelity (Wi-Fi) network with beamforming.

10. A radio access device for positioning a target station (STA), the radio access device comprising:
an interface for receiving sounding feedback from a target station (STA) for each of a plurality of subbands, in response to sending a sounding signal, the sounding feedback including angle-of-arrival (AoA) for each subband of the plurality of subbands; and processing circuitry configured to:
calculate an AoA characteristic from the sounding feedback for at least a subset of the plurality of subbands;
map the AoA characteristics of the at least the subset of the plurality of subbands to a fingerprint in a fingerprint reference map;
determine a location of the target STA based on at least
the fingerprint and
a hazardous gas; and
the determination of the target STA including the processing circuitry being configured to use a time measurement based on the fingerprint not uniquely identifying the location of the target STA.

11. The radio access device of claim 10, wherein the fingerprint reference map comprises a plurality of location coordinates, a plurality of fingerprints, and an association of each of the plurality of fingerprints with at least one of the plurality of location coordinates representing a reference location.

12. The radio access device of claim 10, wherein the fingerprint in the fingerprint reference map comprises a representation of corresponding AoA estimates for the at least the subset of the plurality of subbands for a reference location.

13. The radio access device of claim 10,
wherein the fingerprint reference map is based on AoA estimates for at least the subset of the plurality of subbands, and
wherein mapping the AoA characteristics of the at least the subset of the plurality of subbands to the fingerprint comprises, the processing circuitry configured to determine the AoA estimate in the fingerprint reference map that most closely matches the AoA characteristics.

14. The radio access device of claim 10, wherein determining the location of the target STA based on at least the fingerprint comprises, the processing circuitry further configured to determine the reference location associated with the mapped fingerprint.

15. The radio access device of claim 10, wherein the reference location corresponds to a location of a Cartesian coordinate grid.

16. The radio access device of claim 10, wherein the time measurement is a round-trip time (RTT) measurement.

17. The radio access device of claim 10, wherein determining the location of the target STA is further based on:
Global Positioning System (GPS) measurements.

18. The radio access device of claim 10, wherein the radio access device is an access point (AP) in a wireless fidelity (Wi-Fi) network with beamforming.

* * * * *